J. R. RUMMERFIELD.
DIRECTION INDICATOR.
APPLICATION FILED JULY 18, 1916.

1,268,057.

Patented May 28, 1918.
3 SHEETS—SHEET 1.

Witness
C. B. Beale
J. F. Riley

Inventor
J. R. Rummerfield.
By
Attorney

J. R. RUMMERFIELD.
DIRECTION INDICATOR.
APPLICATION FILED JULY 18, 1916.
1,268,057.
Patented May 28, 1918.
3 SHEETS—SHEET 2.
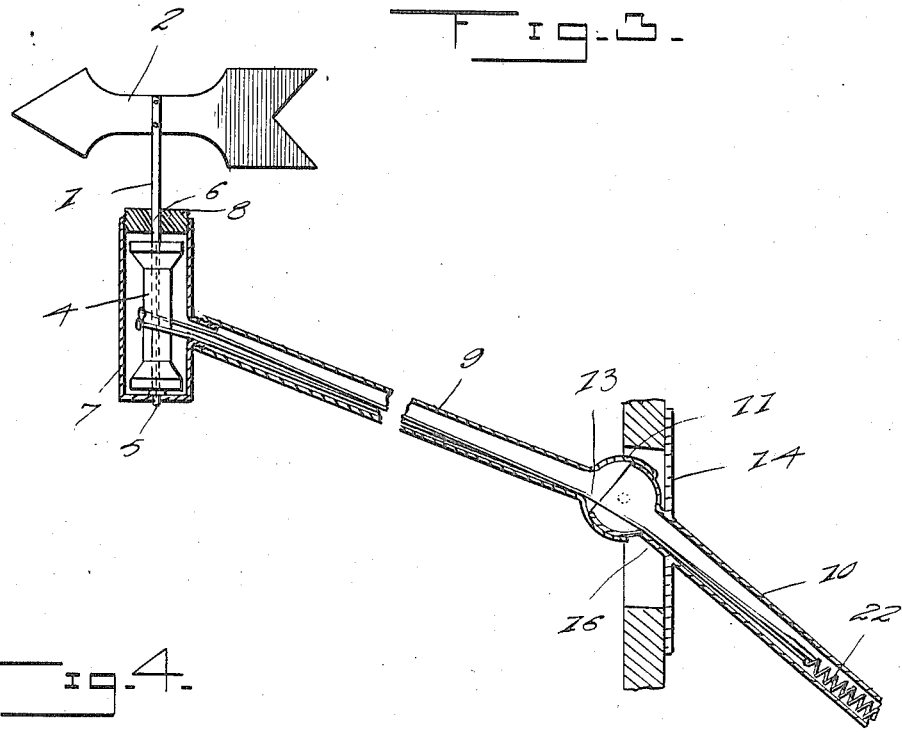
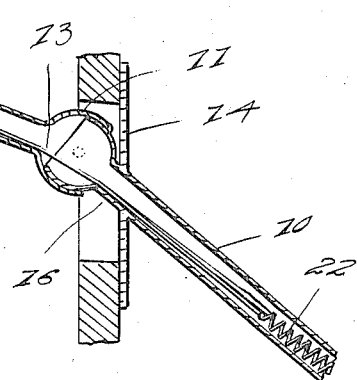
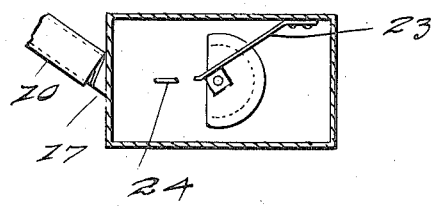
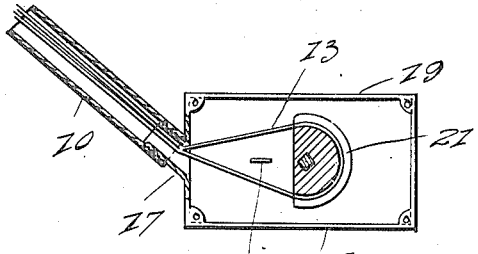
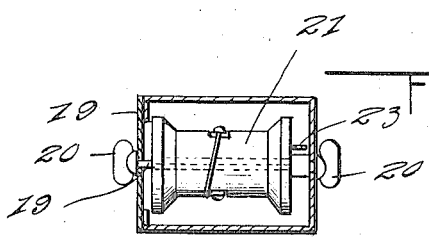
Inventor
J.R. Rummerfield

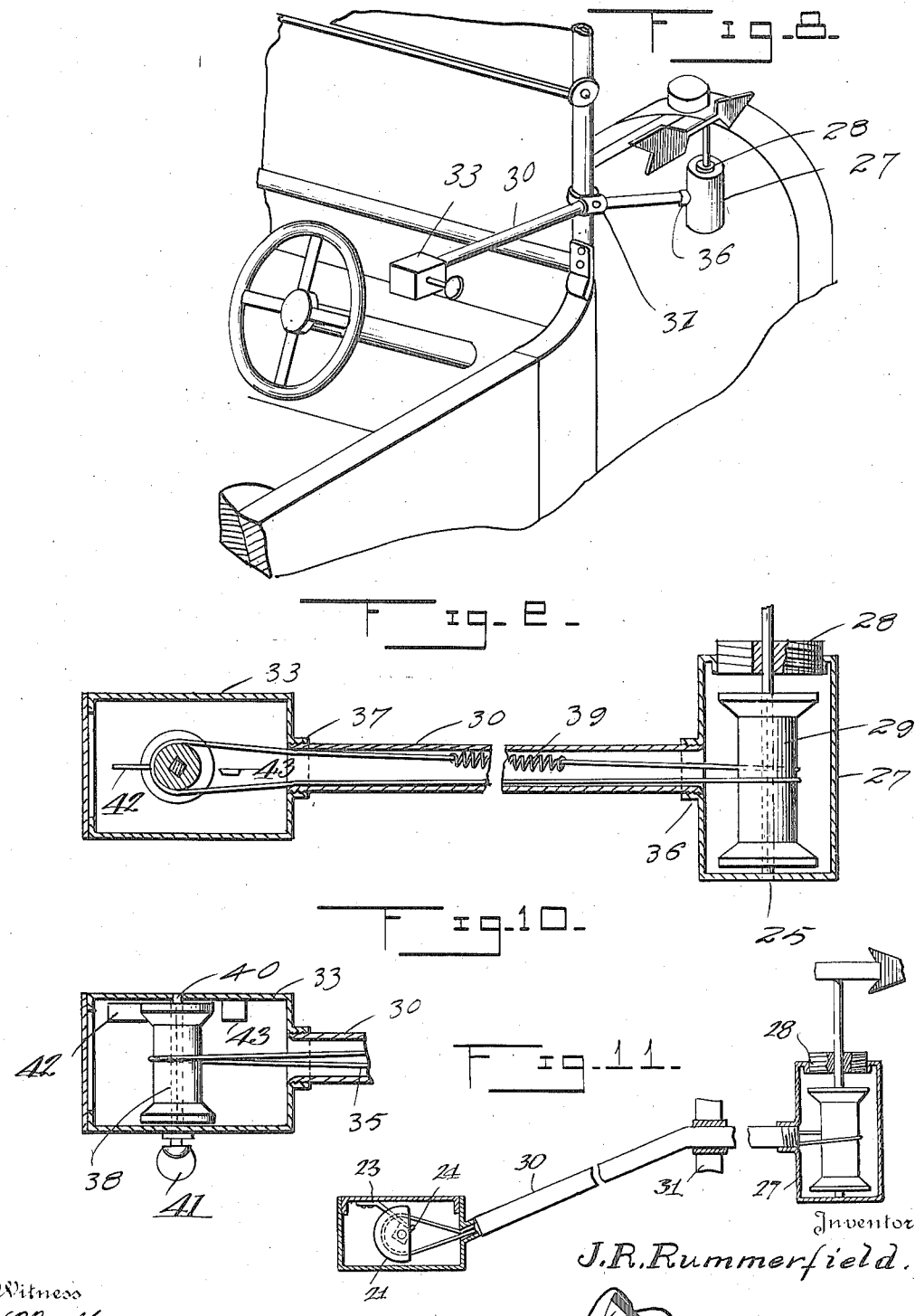

UNITED STATES PATENT OFFICE.

JOSEPH R. RUMMERFIELD, OF PLATTSMOUTH, NEBRASKA, ASSIGNOR OF FORTY-FIVE ONE-HUNDREDTHS TO ADOLPH GIESE, OF PLATTSMOUTH, NEBRASKA.

DIRECTION-INDICATOR.

1,268,057.  Specification of Letters Patent.  Patented May 28, 1918.

Application filed July 18, 1916. Serial No. 109,929.

*To all whom it may concern:*

Be it known that I, JOSEPH R. RUMMERFIELD, a citizen of the United States, residing at Plattsmouth, in the county of Cass and State of Nebraska, have invented certain new and useful Improvements in Direction-Indicators; and I do hereby declare the following to be a full, clear, and exact description of the invention, such as will enable others skilled in the art to which it appertains to make and use the same.

The invention relates to improvements in direction indicators.

The object of the present invention is to improve the construction of direction indicators and to provide a simple, practical and comparatively inexpensive device of strong and durable construction designed to be applied to automobiles, motorcycles and various other motor vehicles and analogous conveyances and equipped with an indicating arrow or member under the control of the operator and adapted to be turned from a central straight position either to the right or left for indicating that the machine or vehicle will move either straight ahead or turn to the right or left.

A further object of the invention is to provide a direction indicator of this character adapted to be readily seen both by crossing policemen, the public and various conveyances so that there will be no mistake in the direction in which the vehicle will move whereby many accidents will be prevented and the travel of cars rendered more safe both to the public and to the vehicles and drivers thereof.

Another object of the invention is to provide a direction indicator of this character adapted to be applied to various types of cars without necessitating any alteration in the construction thereof and capable of supporting the indicating member in a prominent position with the operating means therefor arranged within convenient reach of the driver.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings—

Figure 1 is a side elevation of a direction indicator constructed in accordance with this invention and shown applied to an automobile, Fig. 2 is a plan view of the same, Fig. 3 is an enlarged longitudinal sectional view of a portion of the device, Fig. 4 is a sectional view taken longitudinally of the operating means and illustrating the arrangement of the spring for maintaining the indicating arrow or member firmly in its adjusted position, Fig. 5 is a similar view taken centrally through the operating means, Fig. 6 is a transverse sectional view of the operating device, Fig. 7 is an enlarged detail sectional view illustrating the arrangement of the tension spring, Fig. 8 is a perspective view of a direction indicator illustrating the preferred form of the invention and showing the same applied to a portion of an automobile.

Fig. 9 is a longitudinal sectional view of the device partly broken away,

Fig. 10 is a horizontal sectional view of the inner or rear portion of the device illustrating the arrangement of the operating means.

Fig. 11 is a longitudinal sectional view of the direction indicator, illustrated in Fig. 8 of the drawings, equipped with the operating means illustrated in Figs. 4 and 5 of the drawings.

Like numerals of reference designate corresponding parts in the several figures of the drawings.

Figure 1:
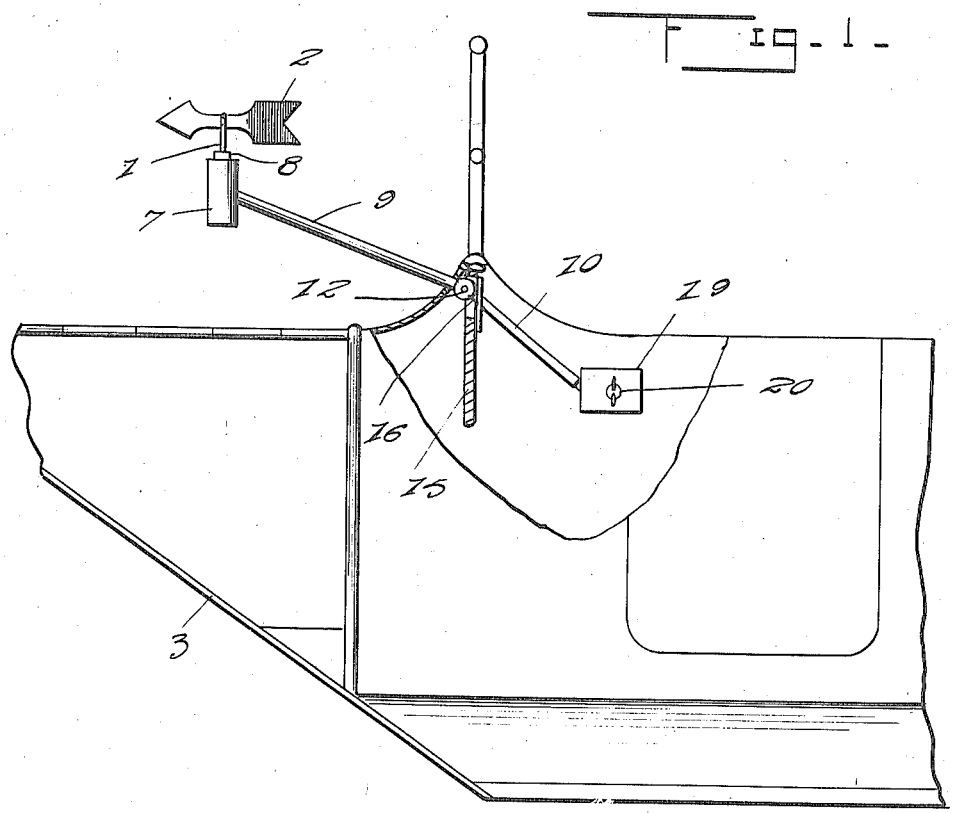
Figure 2:
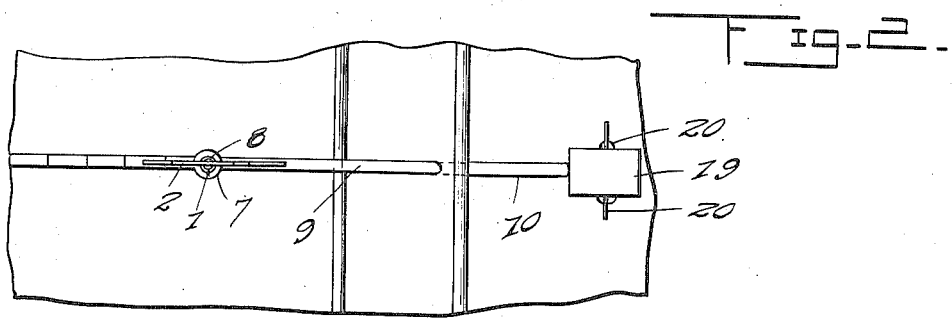
Figure 7:
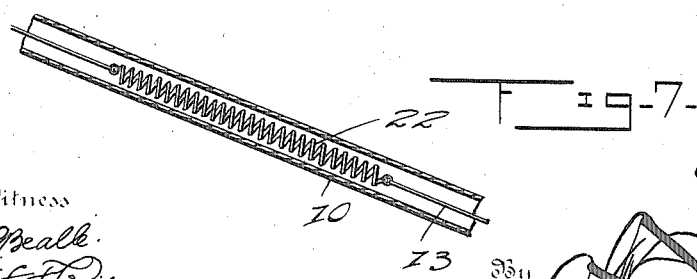

In the accompanying drawings in which is illustrated the preferred embodiment of the invention, the direction indicator comprises in its construction a vertical shaft 1 carrying an indicating arrow or member 2 centrally secured to the upper end of the shaft and designed to be painted in suitable colors or otherwise finished to enable it to be readily seen at a distance and designed to extend centrally of an automobile 3 over the front portion thereof as clearly illustrated in Figs. 1 and 2 of the drawings for indicating that the vehicle is to move straight ahead and capable also of being partially rotated to the right or to the left for indicating that the vehicle is to turn in one direction or the other. This will enable the public, a crossing policeman or other officer controlling the traffic and also the drivers of other vehicles to readily ascertain the direction in which a vehicle is to move when the same stops at a crossing and it becomes necessary to signal to the traffic officer. The shaft is squared to receive a spool or drum 4 and it has rounded portions 5 and 6 forming journals and arranged in upper and lower bearings of a substantially cylindrical casing 7. The casing 7 which is designed to be constructed of sheet metal or other suitable material is provided with a screw cap 8 having the central bearings for the upper journal portion 6 of the shaft and being of sufficient size to enable the shaft with the drum thereon to be readily introduced into and removed from the vertical casing.

The vertical casing is carried by a front section 9 of a tubular member which is also provided with a rear tubular section 10 having a joint 11 composed of two approximately semi-spherical portions secured together by a suitable pivot 12 but the front and rear sections of the tubular member which form a conduit or receptacle or a wire cable 13 may be of any other desired construction as will be readily understood and the front and rear sections may be secured in any suitable manner to each other. The rear section 10 is preferably provided with a vertical attaching plate 14 and the device is applied to the dash 15 of an automobile by boring an opening through the same and passing the front portion of the rear section through the said opening 16, the attaching plate 14 being secured by screws or other suitable fastening devices to the dash and the said opening. The joint 11 is preferably arranged at the front of the dash to enable the arm or section 9 of the tubular member or conduit to be arranged at the proper angle or inclination to support the indicating arrow in the desired position with relation to the hood or adjacent portion of the automobile.

The rear section 10 is preferably screwed on to a nipple 17 of a box or rectangular casing 18 having a removable side or plate 19 and provided with opposite bearings for the reception of a transverse operating shaft 19 provided at its terminals with grips or handles 20 and carrying a segmental drum 21 around which the wire cable 13 passes. The wire cable is preferably provided with a tensioning spring 22 and it may be positively secured to the segmental drum in any desired manner. Any other suitable flexible connection may of course be employed and the transverse operating shaft is squared to receive the segmental head which is adapted to be partially rotated to turn the indicating arrow or member in the desired direction. The ends of the flexible connection are attached to the front vertical drum and the said flexible connection passes therefrom through the tubular member to the rear horizontally disposed segmental drum and it extends around the same and then passes through the said tubular member to the vertical drum to which it is secured. It will thus be seen that by partially rotating the segmental drum the indicating arrow may be turned either to the right or to the left and returned to the central longitudinal position. The squared shaft is engaged by a spring 23 secured at one end to the box or casing and arranged within the same and having its free portion bearing against the said shaft and adapted to engage the flat faces thereof for holding the shaft against movement until the requisite pressure is applied for rotating the shaft by the operating means. The casing is preferably provided with suitable means for limiting the rotation of the operating shaft and the segmental drum to prevent accidental breakage of the flexible connection and this means may consist of a stop lug 24 located in the path of the flat shoe of the segmental head or any other suitable means may be provided for effecting this result. The arrangement of the operating means at the ends of the transverse shaft will enable the shaft to be turned from either side of the box or casing which is supported in convenient position for easy reach by the rear section of the tubular member.

The direction indicating device may be mounted on the dash of an automobile at any desired point and it is preferably located at the side of the driver and in Figs. 8 to 10 inclusive is illustrated the preferred form of the invention in which the direction indicator comprises a front vertical shaft 25 carrying an indicating arrow or member 26 mounted upon the upper end of the shaft 1 and designed to be painted in suitable colors similar to the arrow heretofore described but it may be finished in any desired manner and in practice the arrow may be equipped with a suitable light or a light, either oil or electric may be mounted in any convenient position for throwing the light on the direction indicating device to enable the same to be clearly distinguished in the night time as well as in the day time.

The shaft which is preferably constructed similar to the front vertical shaft heretofore described is journaled in a front substantially cylindrical casing 27 designed to be constructed of sheet metal or other suitable material and provided with a screw cap 28 having a central bearing opening for the upper journal or bearing portion of the shaft and being of sufficient size to enable the shaft with the front drum 29 thereon to be readily introduced into and removed from the cylindrical casing 27. The front substantially cylindrical casing is carried by a tubular member 30 designed to be constructed of any tubular material and secured by a clamp 31 or a plurality of the same to the metallic frame of the wind shield 32. The tubular member is connected at its intermediate point to the metallic frame of the wind shield and its front or outer portion extends laterally from the wind shield while its inner or rear portion extends inwardly or rearwardly for supporting a rear casing or box 33 in a position adjacent to the steering wheel 34 of the automobile so as to be in convenient reach of the driver. The tubular member forms a conduit or housing for a wire cable 35 preferably constructed of steel wires but any other form of flexible connection may of course be employed. The front end of outer end of the tubular member may be screwed into a nipple 36 of the front cylindrical casing or it can be secured to the same in any desired manner such as by soldering, brazing or the like and the rear end of the tubular member is secured in a nipple 37 of the rear casing 33. By this construction the tubular member forms a rigid support for both the inner and outer casings. The wire cable forms practically an endless, flexible connection and it passes around a rear drum 38 and is connected with the front drum 29, a coiled spring 39 similar to that heretofore described being provided for maintaining the flexible connection sufficiently taut to insure a positive operation of the device and at the same time compensate for any sudden movement of the rear drum 38 by an operating shaft 40 whereby all liability of accidentally breaking the flexible connection is eliminated. The operating shaft which is journaled in suitable bearings of the rear box or casing is provided with suitable grips or handles 41 and either or both ends may be equipped with such a grip or handle 41, and the said operating shaft is adapted to be rotated substantially one-half of a revolution for turning the arrow or indicating member to the right or to the left or for entirely reversing the same for indicating an intention to back the machine. The operating shaft is limited in its movement by an arm or projection 42 and a lug or projection 43 located in advance of the operating shaft and in the path of the arm 42. The rear drum of the operating shaft extends entirely across the casing and the arm 42 preferably extends from one end of the drum as clearly illustrated in Fig. 10 of the drawings.

The outer portion of the tubular member projects sufficiently to enable the indicating arrow or member to be readily seen from the front and also from the rear so that a rear indicating or signaling device is unnecessary. In Fig. 11 of the drawings is illustrated the direction indicator illustrated in Fig. 8 equipped with the operating means shown in Figs. 4 and 5 of the drawings, the rear shaft being provided with a segmental drum and having squared portions for engagement with the springs.

It will be seen that the indicating device is exceedingly simple and inexpensive in construction, that it may be applied to various types of automobiles and other vehicles and that it will obviate the necessity of signaling with the hand and will show clearly the direction in which a vehicle will travel thereby lessening the liability of accidents and increasing the safety both of the public and the drivers of vehicles.

What is claimed is:—

1. A direction indicating device including a tubular member provided with means for mounting it on a vehicle, a vertical shaft carried by the tubular member at the front end thereof and having an indicating member, a rear box or casing mounted on the tubular member at the rear end thereof, a shaft journaled in the rear box or casing and provided with a segmental drum, a flexible connection arranged on the segmental drum and extending therefrom to the front vertical shaft and connected therewith, said rear shaft being provided with a plurality of flat faces, a spring engaging the flat faces for holding the indicating member against accidental movement and a stop arranged in the path of the flat face of the segmental drum for limiting the rotary movement thereof to prevent breakage of the flexible connection.

2. A direction indicator of the class described including a tubular supporting member extending longitudinally of a vehicle and composed of front and rear portions arranged at an obtuse angle to each other, said supporting member being provided at the angle formed by the said front and rear portions with means for securing it to a vehicle at one end of the wind shield with the said front portion extending forwardly and laterally from the wind shield in position to be seen from the front and the rear as well as by the driver, a pivoted indicating member mounted on the front portion of the tubular member at the outer end thereof, and operating means located at the rear end of the rear portion of the said tubular member and connected with the pivoted indicating member for turning the same.

3. A direction indicator of the class described including a tubular supporting member extending longitudinally of a vehicle and composed of front and rear portions arranged at an obtuse angle to each other, a clamp mounted on the tubular supporting member at the angle formed by the front and rear portions thereof and provided with jaws for engaging the metallic frame of the wind shield of a vehicle at one end thereof, a pivoted indicating member carried by the outer end of the front portion of the tubular supporting member, an operating device located at the rear end of the supporting member, and connections extending through the tubular supporting member from the operating device to the pivoted indicating member for enabling the latter to be turned by the operating device.

In testimony whereof I affix my signature in presence of two witnesses.

JOSEPH R. RUMMERFIELD.

Witnesses:
O. G. FUCHS,
JOSEPH E. DOUGLASS.